J. L. MINARCIK.
NOODLE CUTTER.
APPLICATION FILED JULY 13, 1920.

1,358,973.

Patented Nov. 16, 1920.

John L. Minarcik,
INVENTOR

BY *Victor J. Evans*
ATTORNEY

WITNESS

UNITED STATES PATENT OFFICE.

JOHN L. MINARCIK, OF PORTLAND, OREGON.

NOODLE-CUTTER.

1,358,973.  Specification of Letters Patent.  Patented Nov. 16, 1920.

Application filed July 13, 1920. Serial No. 395,841.

*To all whom it may concern:*

Be it known that I, JOHN L. MINARCIK, a citizen of the United States, residing at Portland, in the county of Multnomah and State of Oregon, have invented new and useful Improvements in Noodle-Cutters, of which the following is a specification.

This invention relates to kitchen utensils, particularly to devices for forming noodles, and has for its object the provision of a manually operable device including a plurality of disk cutters rotatably mounted with respect to a support and adapted to be rolled back or forth over a thin rolled sheet of dough whereby to cut the same into strips constituting noodles.

An important object is the provision of a device of this character including a cylindrical supporting head of a shell-like nature within which the various disks are rotatable, the main feature being the provision of the segmental cover movable to cover the exposed edges of the disks whereby to protect them against injury and to protect the operator from being cut accidentally when the device is being freely handled.

An additional object is the provision of a device of this character which will be extremely simple and inexpensive in manufacture, highly efficient in use, durable in service, and a general improvement in the art.

Figure 1:
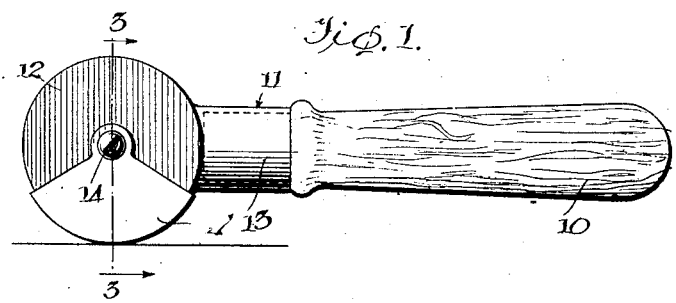
Figure 2:
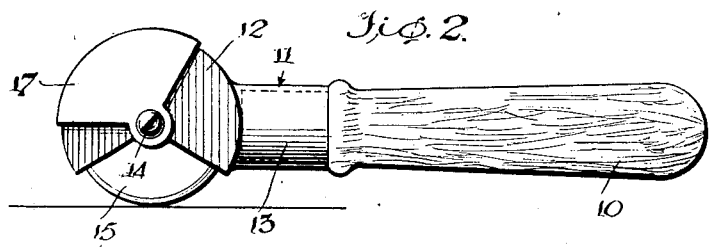
Figure 3:
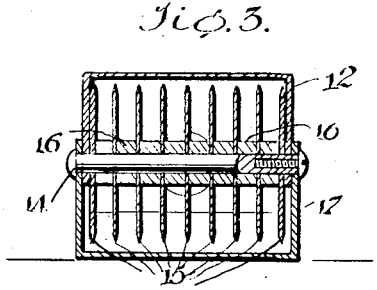

With the above and other objects and advantages in view, the invention consists in the details of construction to be hereinafter more fully described and claimed, and illustrated in the accompanying drawings in which Figure 1 is a side elevation of the device in inoperative position, Fig. 2 is a similar view showing the device in operative position, and Fig. 3 is a cross sectional view taken through the pivot points of the blades.

Referring more particularly to the drawings, the numeral 10 designates a suitable handle which is preferably formed of wood and the numeral 11 designates the guard which is formed preferably of sheet metal and which includes a segmental portion 12 which is a segment of a cylinder and a ferrule portion 13 which is telescopically engaged upon the handle 10. Extending through the sides of the segmental portion 12 is a pivot pin or bolt 14 suitably secured in position and disposed upon this pin or spindle is a plurality of circular blades 15 spaced apart by suitable sleeves 16 engaged upon the spindle. It will be observed that the edges of these disk-like blades are sharpened and that they project beyond the edges of the segmental guard 12 so that when the device is rolled either back or forth over a sheet of thin rolled dough the dough will be cut into a plurality of similar strips constituting noodles.

Associated with the guard 12 is a shield 17 which is formed of sheet metal and which is segmental in shape and this shield is pivoted upon the end portions of the spindle 14 and is capable of being so disposed as to cover the open portion of the guard 12 or to be disposed over the closed portion thereof. When the shield 17 is in such position that it is disposed over the back or closed portion of the guard 12, as shown in Fig. 2, the disks 15 are exposed and may be used for cutting dough. When the shield 17 is disposed to cover the open portion of the guard 12, as shown in Fig. 1, the disks will be entirely inclosed and protected against injury and also covered as to exclude dust or dirt. When the shield is in this latter mentioned position, it will be observed that the device may be handled without any danger of cutting the fingers of the operator.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a handle, a guard formed as a sheet metal member formed as a segment of a cylinder and including a ferrule portion secured upon said handle, a spindle passing through the sides of said guard, a plurality of spaced circular cutting disks rotatable upon said spindle, and a shield member pivoted upon said guard and adapted to close the open portion thereof.

2. A device of the character described comprising a handle, a cylindrical guard secured upon said handle and having a portion of its periphery open, a plurality of cutting disks rotatably mounted within said guard and projecting beyond the opening, and a shield carried by the guard and movable whereby to cover or uncover said opening.

3. A device of the character described comprising a handle, a guard member formed as a segment of a cylinder whereby to define an open portion, said guard being connected with said handle, a plurality of cutting disks arranged in spaced relation and rotatably mounted within said guard whereby to project beyond the open portion thereof, and a shield formed as a segment of a cylinder pivoted upon the sides of said guard and adapted to cover the open portion thereof.

In testimony whereof I affix my signature.

JOHN L. MINARCIK.